US007621309B1

(12) United States Patent
Mondloch et al.

(10) Patent No.: US 7,621,309 B1
(45) Date of Patent: Nov. 24, 2009

(54) PNEUMATIC DRYWALL TAPER

(75) Inventors: Steven J. Mondloch, Kaukauna, WI (US); Jeffrey L. Denkins, Kaukauna, WI (US)

(73) Assignee: Apla-Tech, Inc., Kaukauna, WI (US)

( * ) Notice: Subject to any disclaimer, the term of this patent is extended or adjusted under 35 U.S.C. 154(b) by 876 days.

(21) Appl. No.: 11/172,485

(22) Filed: Jun. 30, 2005

(51) Int. Cl.
*B32B 37/12* (2006.01)
*B44C 7/04* (2006.01)

(52) U.S. Cl. ........................ 156/526; 156/575; 156/577; 156/579

(58) Field of Classification Search ................. 156/574, 156/575, 577, 579, 526
See application file for complete search history.

(56) References Cited

U.S. PATENT DOCUMENTS

| | | | | |
|---|---|---|---|---|
| 2,815,142 | A | 12/1957 | Ames | |
| 4,080,240 | A | 3/1978 | Dysart | |
| 4,086,121 | A | 4/1978 | Ames | |
| 4,090,914 | A | 5/1978 | Hauk et al. | |
| 4,127,434 | A | 11/1978 | Lass | |
| 4,208,239 | A * | 6/1980 | Lass | 156/575 |
| 4,592,797 | A | 6/1986 | Carlson | |
| 4,828,647 | A | 5/1989 | Eccleston | |
| 5,230,608 | A | 7/1993 | Januska | |
| 5,863,146 | A | 1/1999 | Denkins et al. | |
| 2005/0051278 | A1* | 3/2005 | Dobson | 156/579 |

* cited by examiner

*Primary Examiner*—Mark A Osele
(74) *Attorney, Agent, or Firm*—Andrus, Sceales, Starke & Sawall, LLP

(57) ABSTRACT

A drywall taper is provided for applying drywall compound and tape to a wallboard joint. The drywall taper has an applicator head mounted on one end of a drywall compound storage device having a movable plunger with a drywall compound flow path extending from an opposite end of the storage device to an outlet on the applicator head. A pressurized air arrangement is provided for pushing the plunger and delivering drywall compound through the drywall compound flow path. An actuating arrangement is slidably disposed upon the storage body and is engaged with a tape advancing mechanism, a tape severing device and a creaser wheel assembly for separately controlling tape advancement, tape severing and creaser wheel movement. In another version, the plunger is eliminated so that a substantially continuous flow of pressurized drywall compound is provided through an unobstructed delivery tube to the applicator head.

23 Claims, 13 Drawing Sheets

FIG. 20
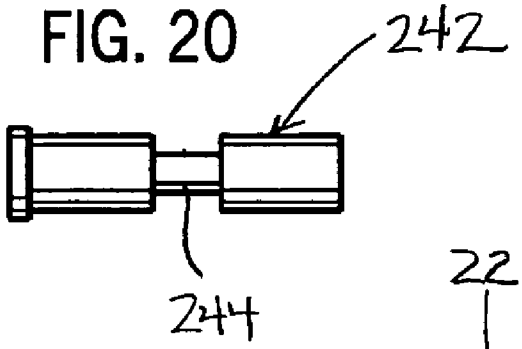
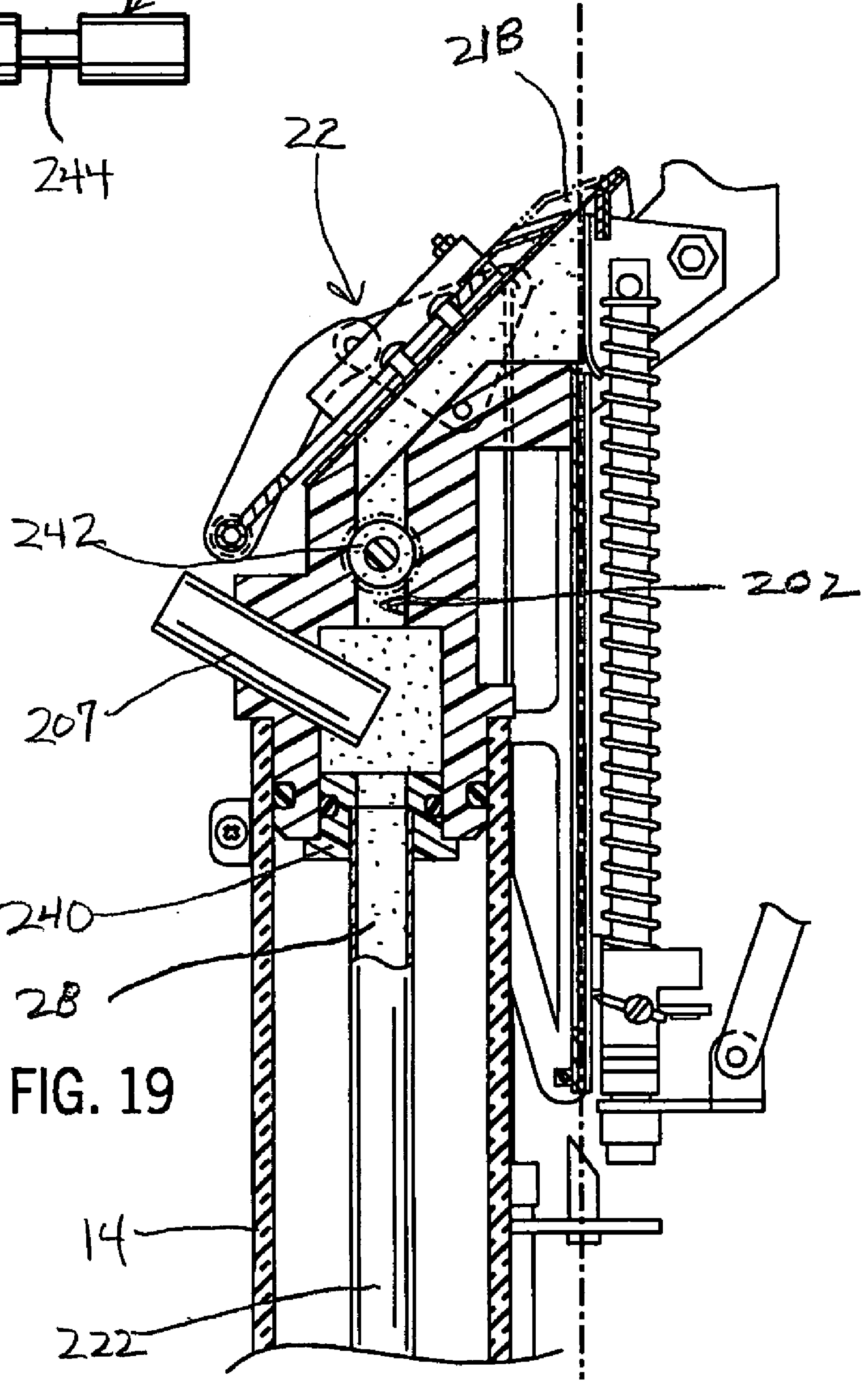
FIG. 19

PNEUMATIC DRYWALL TAPER

FIELD OF THE INVENTION

This invention relates generally to an apparatus for applying drywall compound and tape to wallboard joints. More particularly, the present invention pertains to a pressurized drywall taper having an improved control for simultaneously feeding drywall compound and drywall tape to a wallboard joint, selectively cutting the drywall tape and actuating a creaser wheel assembly.

BACKGROUND OF THE INVENTION

Conventional drywall tape typically fabricated of non-adhesive backed paper is secured over joints between sheets of drywall with a drywall compound sometimes referred to as "mud". Prior art devices known as drywall tapers such as described in U.S. Pat. Nos. 3,960,643; 4,086,121; 4,652,331 and 5,013,380 have been developed to contemporaneously apply conventional drywall tape and mud to seal drywall joints. In these devices, tape is coated with mud as the tape is drawn through rollers or a drive wheel from a continuous roll of tape. The mud-coated tape is then applied over drywall joints and pressed into place with the drive wheel or rollers.

These prior art devices also includes a hollow storage body for receiving and storing a supply of drywall compound, an applicator head mounted to the top end of the storage body and a plunger which is moveably positioned in the storage body. Drywall compound or mud filling the storage body can be pushed by the plunger through a passageway in the applicator head to apply mud to the tape before the tape is applied over the drywall joints.

U.S. Pat. No. 4,086,121 to Ames discloses a well known prior art self-contained drywall taper. In this design, a piston slidably mounted in a hollow drywall compound-receiving body is automatically moved by means of a cable arrangement connected to and actuated by tape-engaging drive wheels on a compound dispensing front nozzle. The drive wheels must be rotated over a wallboard surface in order to force a layer of drywall compound onto a drywall tape just before it is applied to the surface. A sleeve slidably mounted on the body is moved in one direction to initially feed the tape into engagement with the drive wheels, and is moved in an opposite direction to actuate a tape cutting mechanism. A separate and additional cable and pulley arrangement is employed to selectively swing a tape creasing disk into position when applying the tape in a corner joint.

In using devices of the type described above, however, it has been found that several problems arise during use which negatively affect the maintenance costs, ease of operation, work effectiveness and taping quality. One of the chief drawbacks resides in the cable arrangement between the piston and the drive wheels which results in creating a drag force that requires substantially more operator effort in a taping operation. Any slippage of the drive wheels on the wallboard will leave a dry spot on the tape which is unacceptable. In addition, prior arrangements do not permit an operator to increase or decrease the amount of drywall compound being delivered during a taping procedure. In fact, stoppage of the prior art tool will not allow any drywall compound to be delivered. From a maintenance standpoint, the cable is liable to irregularly wind up over itself altering the rate of delivery and is prone to break so that taping operations are compromised by having to repair or replace the cable. In the same vein, this design has a complexity of parts which may require further increase in upkeep. Further, the Ames device is not readily detachable into simple assemblies so that the body is not intended to be interchangeable nor is the device easily cleaned so that working effectiveness is impaired. Moreover, the severing device is generally inaccessible and is susceptible to jamming. The creaser disc requires actuation from a lever control located remote from the actuating sleeve.

It is therefore desirable that the apparatus for applying drywall compound and tape to wallboard joints be provided with an enhanced design and a more unified control arrangement that will improve the versatility, operability, speed and efficiency of a drywall taper in all aspects of a drywall taping operation.

SUMMARY OF THE INVENTION

It is one object of the present invention to provide a system for permitting drywall compound to be uniformly delivered to a wallboard with various rates to accommodate the desired taping operation.

It is also an object of the present invention to provide a pressurized drywall taper which delivers drywall compound to a wallboard joint independent of the movement of the tape engaging rollers and without drag thereof.

It is another object of the present invention to provide an improved control for supplying drywall compound to a tape, selectively severing the tape and optionally engaging a creaser wheel.

It is a further object of the present invention to provide a drywall taping apparatus which relies on pressurized air to advance a supply of drywall compound to an applicator head.

It is an additional object of the present invention to provide a taping tool having a more accessible severing device which provides a more positive cutting force to the tape when desired.

It is another object of the present invention to provide a pressurized drywall taper having an interchangeable, transparent storage body and an interchangeable on/off valve.

Yet another object of the present invention is to provide a drywall taper having a reduced number of components which simplifies maintenance.

Still another object of the present invention is to provide a pressurized drywall taper which permits substantially continuous flow of drywall compound to a wallboard joint.

In one aspect of the invention, a drywall taper is provided for applying drywall compound and tape to a wallboard joint. The drywall taper includes a hollow storage body for holding a supply of drywall compound, and a moveable plunger disposed within the storage body and engageable with the drywall compound. An applicator head is connected to a top end of the hollow storage body with the applicator head having a drywall compound passage formed therein. A roller is rotatably mounted on the applicator head for engaging the tape against the wallboard joint. A tape advancing mechanism is attached to the applicator head for advancing a supply of tape to the roller, and a tape severing device is secured to the applicator head for selectively cutting the tape. A creaser wheel assembly is moveably mounted to the applicator head for selectively engaging the wallboard in advance of the roller. A driving source is independent of the roller and is engageable with the plunger for selectively providing a driving force such that the plunger pushes the supply of drywall compound out of the storage body through the drywall compound passage in the applicator head. An actuating arrangement is slidably mounted on the storage body and is engaged with the tape advancing mechanism, the tape severing device and the creaser wheel assembly for separately and individually controlling tape advancement, tape severing and movement of the creaser wheel assembly.

The applicator head preferably includes a dispenser body having a top to which the tape advancing mechanism is secured, a bottom provided with a fill valve for filling the body with drywall compound and an inclined front face to which the tape severing device is joined. The dispenser body includes an interchangeable, rotatable on/off metering valve disposed in the drywall compound passage. The tape severing device is fully accessible externally of the applicator head. The storage body is both transparent and interchangeable. A power supply head is connected to a bottom end of the storage body. The driving source is in communication with the power supply head. The driving source is comprised of air pushing against the plunger. An air supply control assembly is attached to the power supply head.

In another aspect of the invention, a drywall taper is provided for applying drywall compound and tape to a wallboard joint. The drywall taper has an applicator head mounted on one end of the drywall compound storage device, there being a drywall compound flow path extending from an opposite end of the storage device to an outlet on the applicator head. An arrangement is provided for delivering drywall compound through the drywall compound flow path. A roller is rotatably mounted on the applicator head for contacting a wallboard. A tape advancing mechanism is secured on the applicator head for advancing a supply of tape to the outlet and to the roller. A tape severing device is connected to the applicator head for cutting the tape, and a creaser wheel assembly is moveably mounted to the applicator head. The invention is improved by means of an actuating arrangement slidably disposed on the storage body and engaged with the tape advancing mechanism, the tape severing device and the creaser wheel assembly for separately controlling tape advancement, tape severing and creaser wheel movement.

The arrangement for delivering drywall compound is independent of the roller. The actuating arrangement includes an actuating sleeve surrounding the storage body, and an actuating tube having a lower end connected to the sleeve for sliding movement therewith and for rotatable movement relative to the sleeve by means of a spring-biased trigger mechanism engaged with the sleeve. The actuating tube is slidable along a connecting wire having an upper end attached to the tape severing device, and a lower end having a stop element located within an interior of the actuating tube and engageable with a cap on an upper end of the actuating tube.

In yet a further aspect of the invention, a drywall taper is provided for applying drywall compound and tape to a wallboard joint. The drywall taper has an applicator head mounted on one end of a drywall compound storage device. The applicator head has a dispenser body, there being a drywall compound flow path extending from an opposite end of the storage device to an outlet on the dispenser body. An arrangement is provided for delivering drywall compound through the drywall compound flow path. A roller is rotatably mounted on the applicator head for contacting a wallboard. A tape advancing mechanism is secured on the applicator head for advancing a supply of tape to the outlet and to the roller. A tape severing device is connected to the applicator head for cutting the tape. An actuator arrangement is moveably mounted on the storage device for actuating the tape advancing mechanism and the tape severing device. The invention is improved wherein the tape advancing mechanism is secured on a top of the dispenser body, and the tape severing device is mounted on an inclined front face of the dispenser body away from the tape advancing mechanism so that the tape severing device is fully accessible from an exterior of the applicator head.

The tape severing device includes a mounting plate fixed to the front face of the dispenser body and a pair of spaced apart, slide blocks secured to the mounting plate. A slide plate is slidably received in the slide blocks. A pair of moveable link arms extends alongside the slide blocks with the link arms being connected at rear ends by a transverse bar attached to the slide plate, and being joined at front ends to a pair of interconnected links pivotally connected to the applicator head. One of the links is attached by a connecting wire to the actuating arrangement. The links are interconnected by a rod extending across the dispenser body. A moveable angled knife edge is fixed to the slide plate and a stationary knife edge is fixed to a front end of the mounting plate. The moveable knife edge is normally spaced from the fixed knife edge to define a tape-receiving gap aligned with the outlet in the dispenser body. A drywall compound fill valve is located on a bottom of the dispenser body.

In still a further aspect of the invention, a drywall taper is provided for applying drywall compound and tape to a wallboard joint. The drywall taper includes a hollow storage body and an applicator head connected to a top end of the storage body. The applicator head has a drywall compound passage formed therein. A roller is rotatably mounted thereon for engaging the tape against the wallboard joint. A tape advancing mechanism is attached to the applicator head for advancing a supply of tape to the roller. A tape severing device is secured to the applicator head for selectively cutting the tape and a creaser wheel assembly is movably mounted to the applicator head for selectively engaging the tape against the wallboard in advance of the roller. A delivery tube is disposed in the storage body for delivering drywall compound completely therethrough. The delivery tube has a first end connected to a drywall compound supply assembly fed directly by a source of pressurized drywall compound. The delivery tube has a second end opposite the first end connected and in communication with the applicator head. An actuating assembly is slidably mounted on the storage body and engaged with the tape advancing mechanism, the tape severing device and the creaser wheel assembly for separately and individually controlling tape advancement, tape severing and movement of the creaser wheel assembly. A bottom end of the storage assembly is connected to the drywall compound supply assembly. The drywall compound supply assembly includes a live swivel rotatably coupled to a needle valve and an in-line valve. The needle valve has an adjustment control for altering volume of drywall compound supply through the in-line valve. The in-line valve includes a handle for controlling admission of pressurized drywall compound therethrough. The applicator head includes a plug having a grooved portion for continuously metering drywall compound.

Various other objects, features and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 19 is an elevational view of a metering plug used in the apparatus of FIG. 18; and FIG. 20 is an enlarged elevational view of the upper end of the apparatus of FIG. 18.

DETAILED DESCRIPTION OF THE INVENTION

Figure 1:
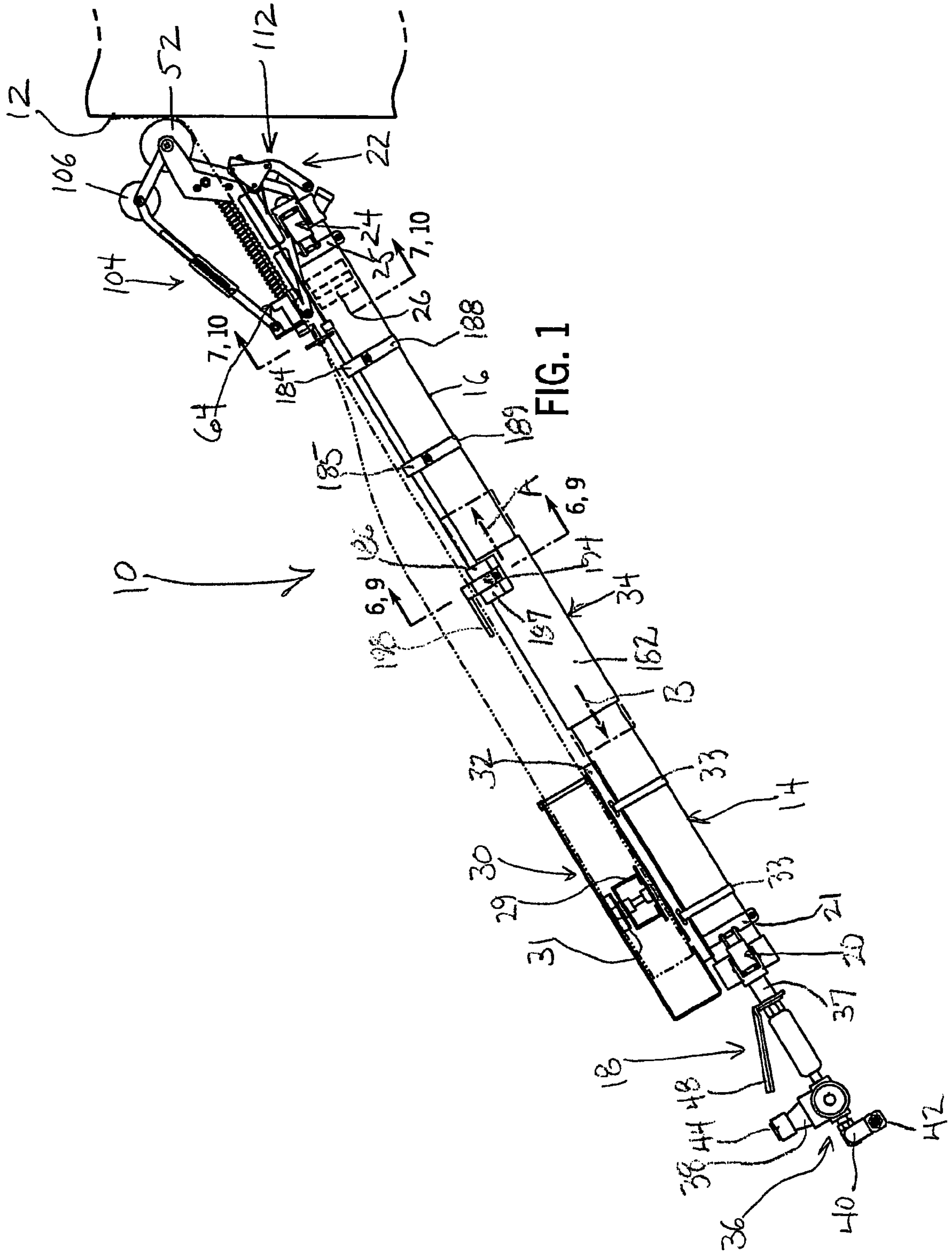
FIG. 1 is an elevational view of an apparatus for applying tape and drywall compound to wallboard joints in accordance with the present invention.

Referring now to the drawings, FIG. 1 illustrates an apparatus 10, known as a drywall taper, for applying drywall compound and tape to a joint between adjacent sections of wallboard 12.

The apparatus 10 includes a hollow, tubular storage body 14 which extends lengthwise along a longitudinal axis. The storage body 14 has a cylindrical outer wall 16 having a bottom end provided with a power supply head 18 detachably coupled thereto by one set of latches 20. A first circular bracket 21 attaches latches 20 to body 14. The outer wall 16 has a top end provided with an applicator head 22 removeably attached thereto by a second set of latches 24. A second circular bracket 25 secures latches 24 to the body 14. Slidably mounted inside the outer wall 16 is a generally cylindrical plunger 26 which is used to advance a supply of drywall compound or mud 28 (FIG. 16) in the storage body 15 to the applicator head 22. Preferably, the outer wall 16 is fabricated of a transparent material which enables visual inspection of the changing volume of drywall compound 28 in the storage body 14. Depending on the taping requirements, the storage body 14 may be supplied in a variety of different sizes typically ranging from 2-5 feet in length. A roll of conventional joint tape 30 is freely rotatably mounted upon a holder 29 on the outside wall 16 of storage body 14, and held in position on a bracket 32 secured by retainers 33. The holder 29 has an adjustable tensioning mechanism 31 for regulating the tension on tape 30 as it is unwound. The tape 30 extends longitudinally up the outer wall 16 towards the applicator head 22 where it is selectively dispensed and severed using an actuating arrangement 34 slidably mounted relative to the storage body as will be further described below.

The power supply head 18 is operably connected with an air supply control assembly 36 which admits and controls a supply of compressed air to be selectively applied to a lower end of the plunger 26. The air supply control assembly 36 includes an actuator 37, a pressure regulator 38 and an air supply connector 40. The air supply connector 40 is connected to a supply of compressed air (e.g. an air compressor not shown) by a quick disconnect fitting 42. Pressure regulator 38 has an adjustment knob 44 and a readout dial 46 which provides a visual indication of the air pressure passing through the pressure regulator 38. The adjustment knob 44 can be rotated to increase or decrease the pressure from the source of compressed air. To open the actuator 37, a handle 48 is provided which controls the emission of pressurized air into the power supply head 18 for application to the lower end of the plunger 26.

Figure 2:
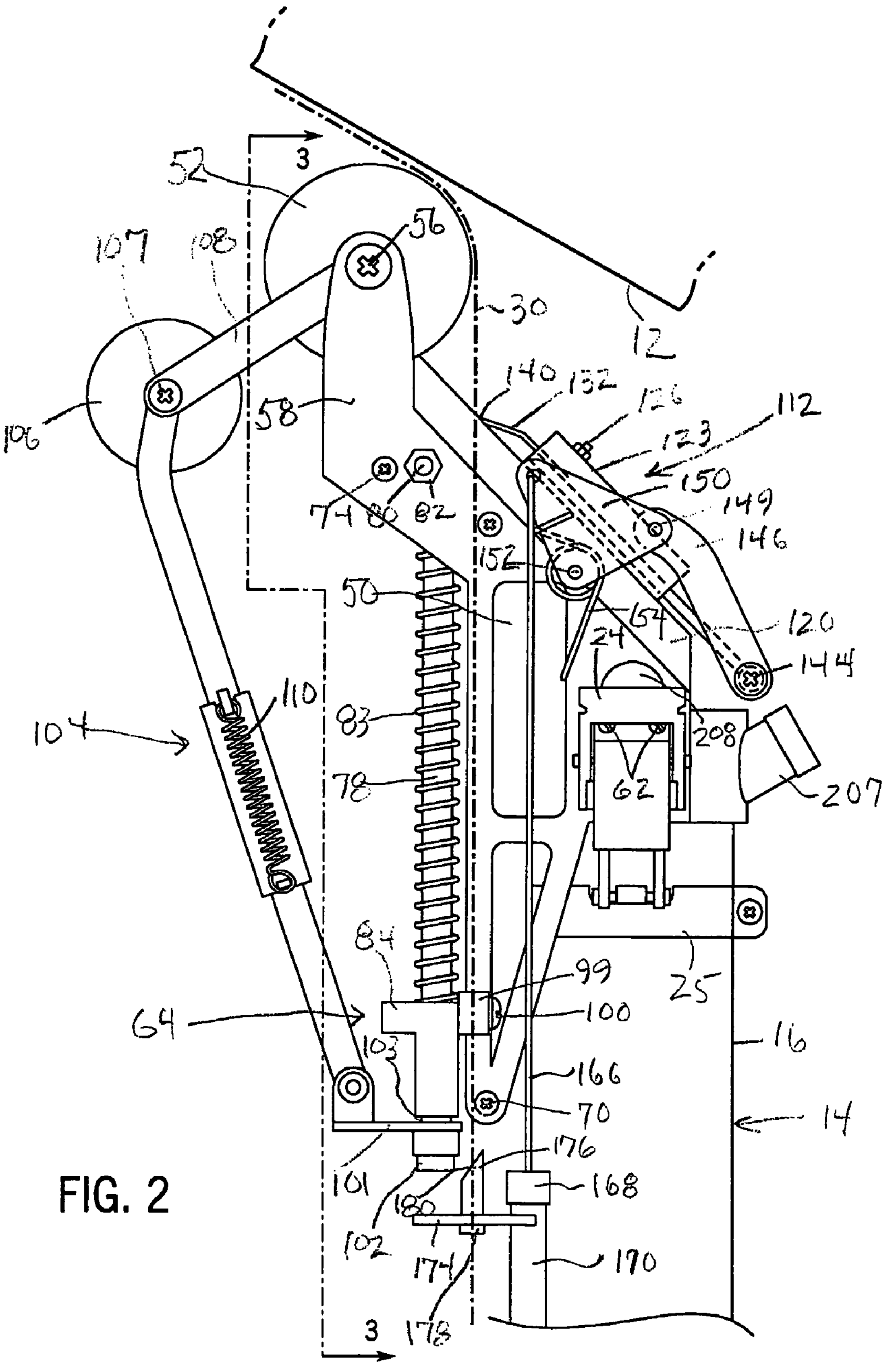
FIG. 2 is an enlarged, fragmentary front elevational view of an applicator head for the apparatus of FIG. 1.
Figure 3:
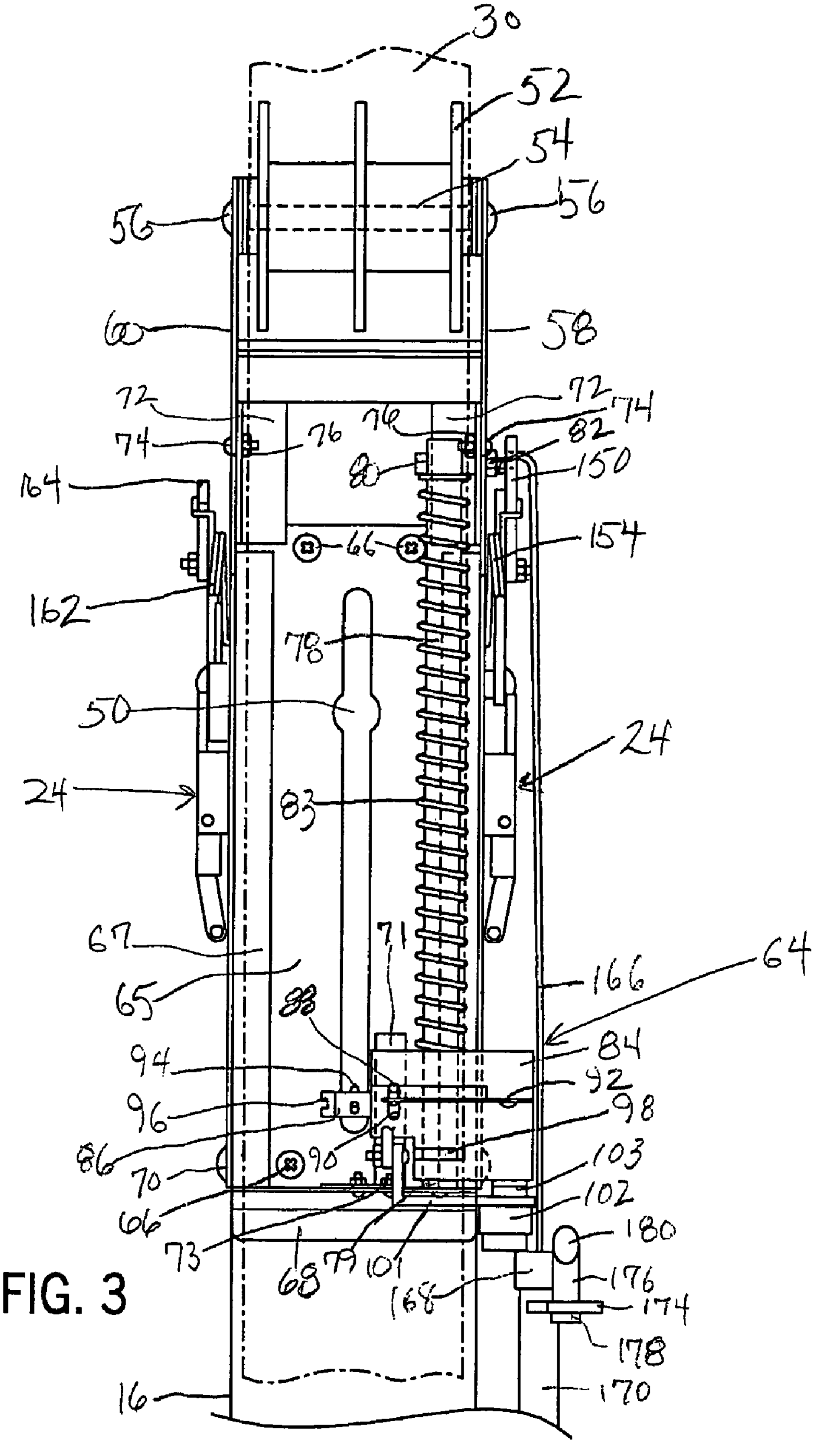
FIG. 3 is a partial elevational view of the tape advancing mechanism taken on line 3-3 of FIG. 2.
Figure 4:
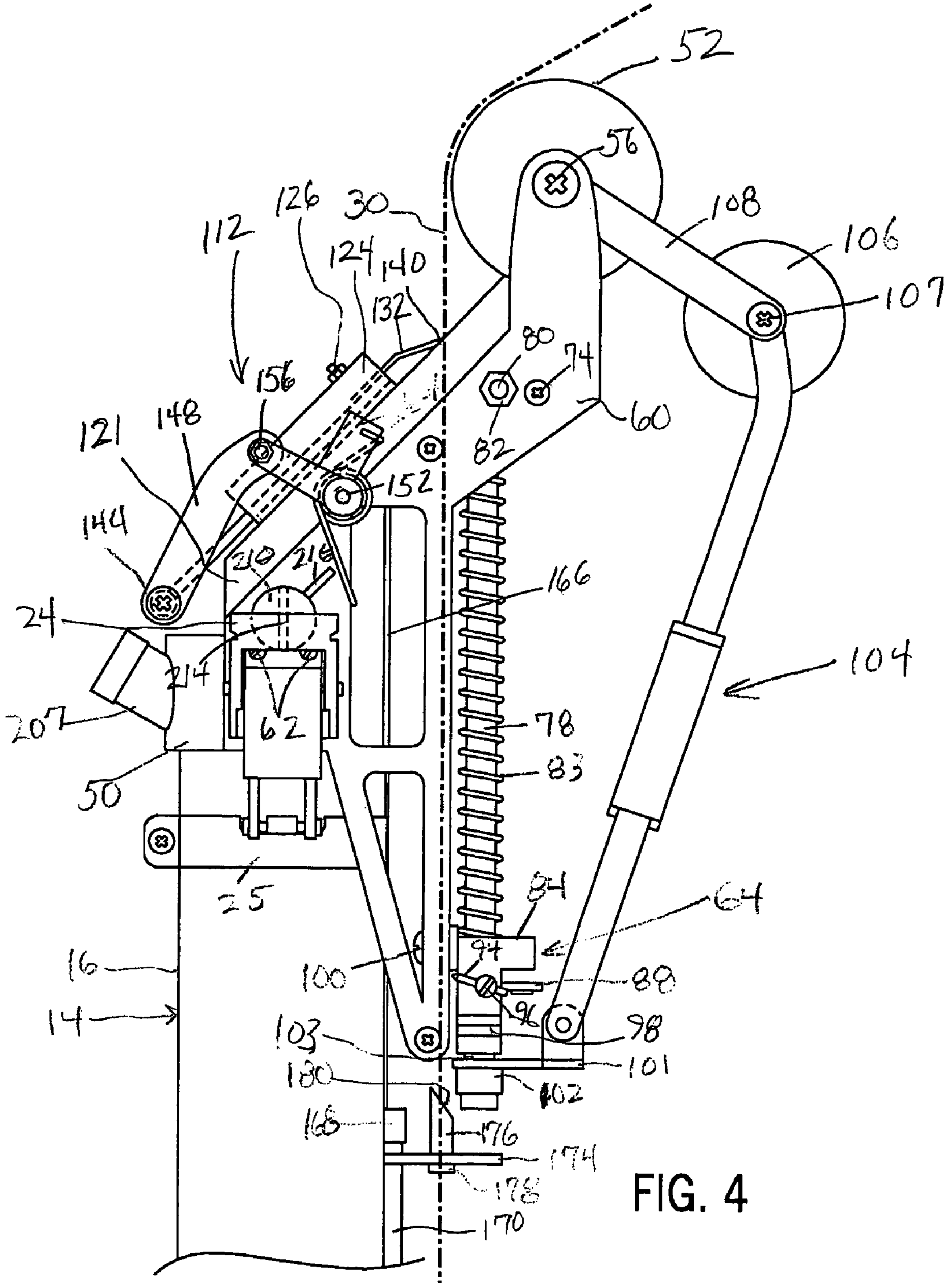
FIG. 4 is a rear elevational view of FIG. 2.
Figure 15:
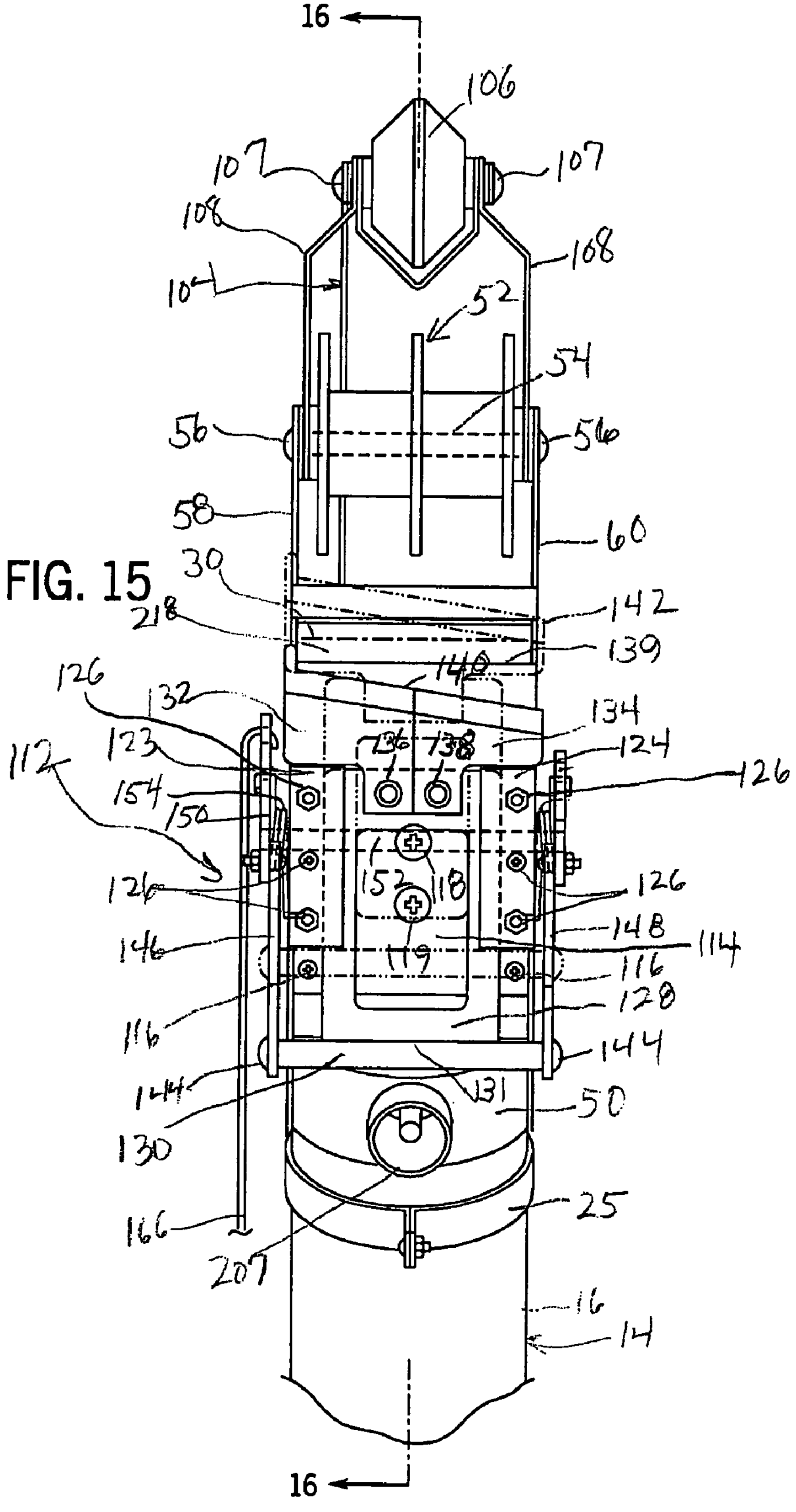
FIG. 15 is a partial elevational view taken on line 15-15 of FIG. 11.

Referring now to FIGS. 2, 3 and 15, the applicator head 22 includes a plastic injection molded body 50 having a main roller 52 mounted for rotation on a shaft 54. Shaft 54 is retained by screws 56 between a pair of materially-relieved side frames 58, 60 to body 50 by fasteners 62. As is known, the roller 52 is used to rollably apply drywall compound-coated tape 30 to a wallboard joint. A tape advancing mechanism 64 is located at the top of the dispenser body 50 and connected between upper ends of the side frames 58, 60. As seen in FIGS. 3 and 4, the tape advancing mechanism 64 includes a guide plate 65 secured to the body 50 by screws 66 for slidably guiding tape 30 from the roll towards the main roller 52. The guide plate 65 has curled side edges 67 for retaining edges of the tape 30. A lower end of the guide plate 65 includes a bent portion 68 for facilitating entry of the tape 30 into the guide plate 65. A reinforcing bar 69 extends behind the bent portion 68 and between the side frames 58, 60 and is secured thereto by screws 70. A retaining finger 71 (FIG. 3) is joined by fasteners 73 to a lower end of the guide plate 65 to keep the tape 30 from falling out of the dispenser mechanism 64. A pair of auxiliary guides 72 is fastened to inside surfaces of the side frames 58, 60 by screws 74 and nuts 76 on an upper end of guide plate 65 to further control the correct path of the tape 30 to a dispensing location of drywall compound 28. A cylindrical rail 78 extends along one edge of the guide plate 65 for substantially the entire length thereof. The rail 78 has an enlarged top end attached by a screw 80 and nut 82 to the upper end of side frame 58, and a bottom end fixed to the lower end of guide plate 65 by screws 79. A coil spring 83 surrounds the rail 78 between its top and bottom ends.

Figure 11:
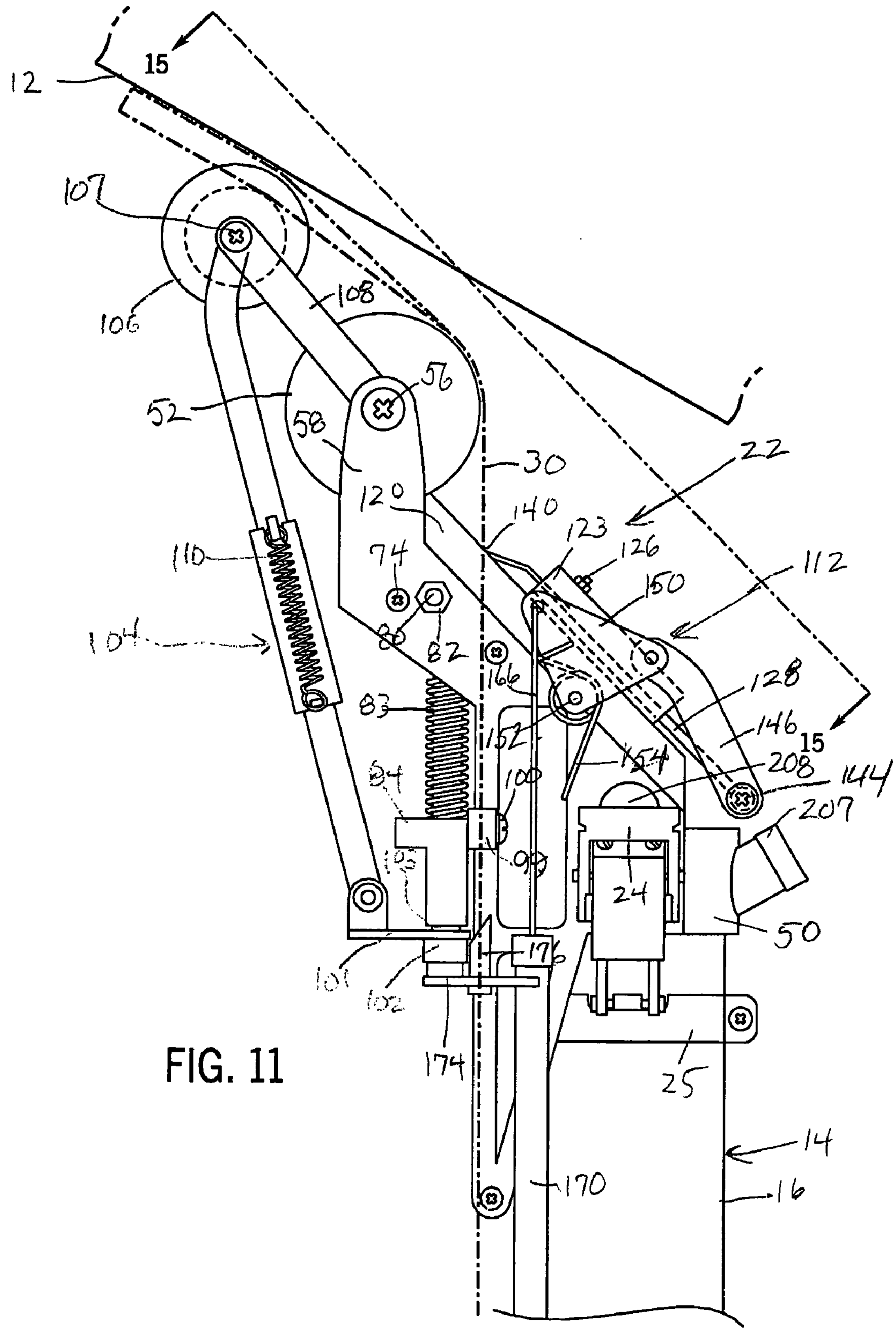
FIG. 11 is a view like FIG. 1 showing a creaser wheel engaged against a drywall tape.

A tape advance block 84 is slidably and rotatably mounted on rail 78 and is engageable with the actuating arrangement 34 for advancing the tape 30. The block 84 carries a rotatable pivot 86 having a transverse extension 88 which protrudes from a vertical slot 90 and is biased in a desired position by a leaf spring 92. A tape engaging pin 94 extends perpendicularly to the pivot 86 and is adjustably retained therein by a screw 96 threaded into pivot 86. The block 84 has a wiper 98 which is periodically lubricated to enable a friction-reduced sliding of the internal surface of the block 84 on the rail 78. As seen in FIG. 2, a roller 99 is attached to the rear of block 84 by a screw 100. The roller 99 rolls along a surface of side plate 58. A bracket 101 is swingably mounted about a neck 103 of an engagement roller 102 depending from the block 84. Bracket 101 is pivotally adjoined to a lower end of a multi-piece, spring-biased moveable strut arrangement 104 having a creaser wheel 106 (FIG. 15) rotatably mounted at an upper end thereof. The creaser wheel 106 is also attached by screws 107 to a bifurcated bracket 108 rotatably secured to the shaft 54 holding the main roller 52. The strut arrangement 104 permits the creaser wheel 106 to be transferred into position (FIG. 11) by means of the actuating arrangement 34 beyond the main roller 52 when it is desired to apply the tape 30 with a crease such as in corner joints. A spring 110 is provided on strut arrangement 104 to maintain the relationship between upper and lower portions thereof.

Referring to FIGS. 2, 4 and 14-16, the severing device 112 is mounted along a front inclined face 113 of the dispensing body 50 for selectively cutting the drywall tape 30 either in a compound-coated condition or an uncoated condition. The severing device 112 includes a mounting plate 114 anchored to the face 113 by outer screws 116 and inner screws 118, 119. The mounting plate 114 has a first side portion 120 (FIG. 2) and a second side portion 121 (FIG. 4). A pair of spaced apart slide blocks 123, 124 is rigidly fastened to the mounting plate 114 by fasteners 126. The slide blocks 123, 124 slidably receive a slide plate 128 which is welded to a transverse bar 130 at a rearward end 131 thereof. A pair of adjacently disposed knife segments 132, 134 are anchored by posts 136, 138 to a forward end 139 of slide plate 128. The knife segments 132, 134 define an angled, downwardly bent, moveable knife edge 140 which is slidably engageable against a stationary knife edge 142 mounted between front ends of the side portions 120, 121 on mounting plate 114. The knife edge 142 is spaced from the forward end 139 of the slide plate 128 to form a gap through which the tape 30 is passed.

Transverse bar 130 is retained by screws 144 between proximal ends of a pair of parallel link arms 146, 148. The link arms 146, 148 provide shearing force to cut the tape 30 without generating diagonal loading on slide blocks 123, 124. Distal end of link arm 146 is pivotally attached at 147 to one corner of a triangular link 150 (FIG. 2) which in turn is rotatably secured at a second corner about a rod 152 (FIGS. 2, 15) extending through the dispenser body 50. A torsion spring 154 encircles rod 152 and is positioned between the triangular link 150 and an area defined by side frame 58 and side portion 120 as best seen in FIG. 2. The torsion spring 154 has a first end engaged behind side portion 120 and a second end engaged between a portion of side frame 58. Distal end of the other link arm 148 is similarly attached as described above.

Figure 12:
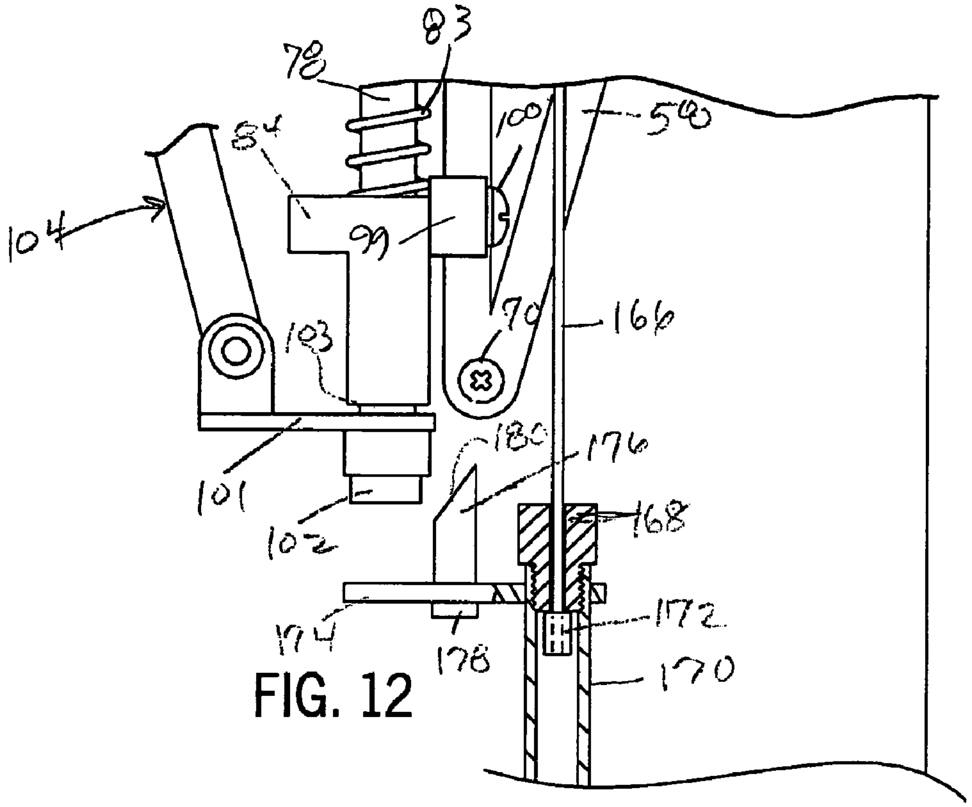
FIG. 12 is an enlarged, fragmentary elevational view of the actuating tube in a non-engaged position with the tape advancing mechanism.
Figure 13:
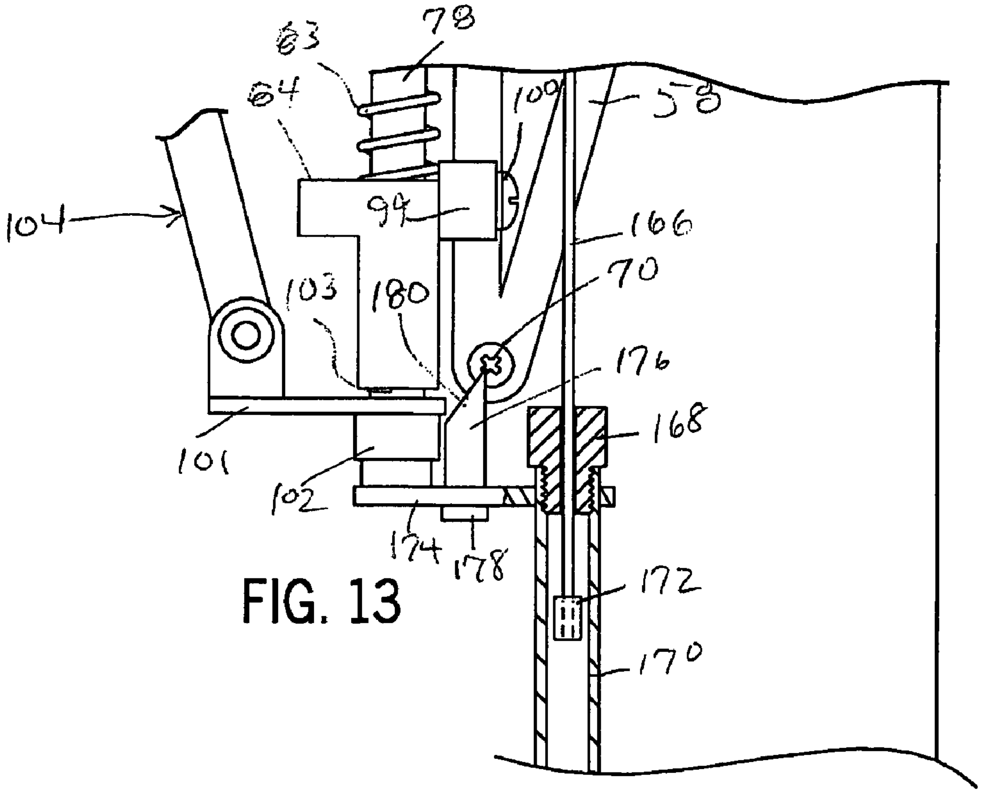
FIG. 13 is a view like FIG. 12 showing the actuating tube in an engaged position with the tape advancing mechanism.
Figure 14:
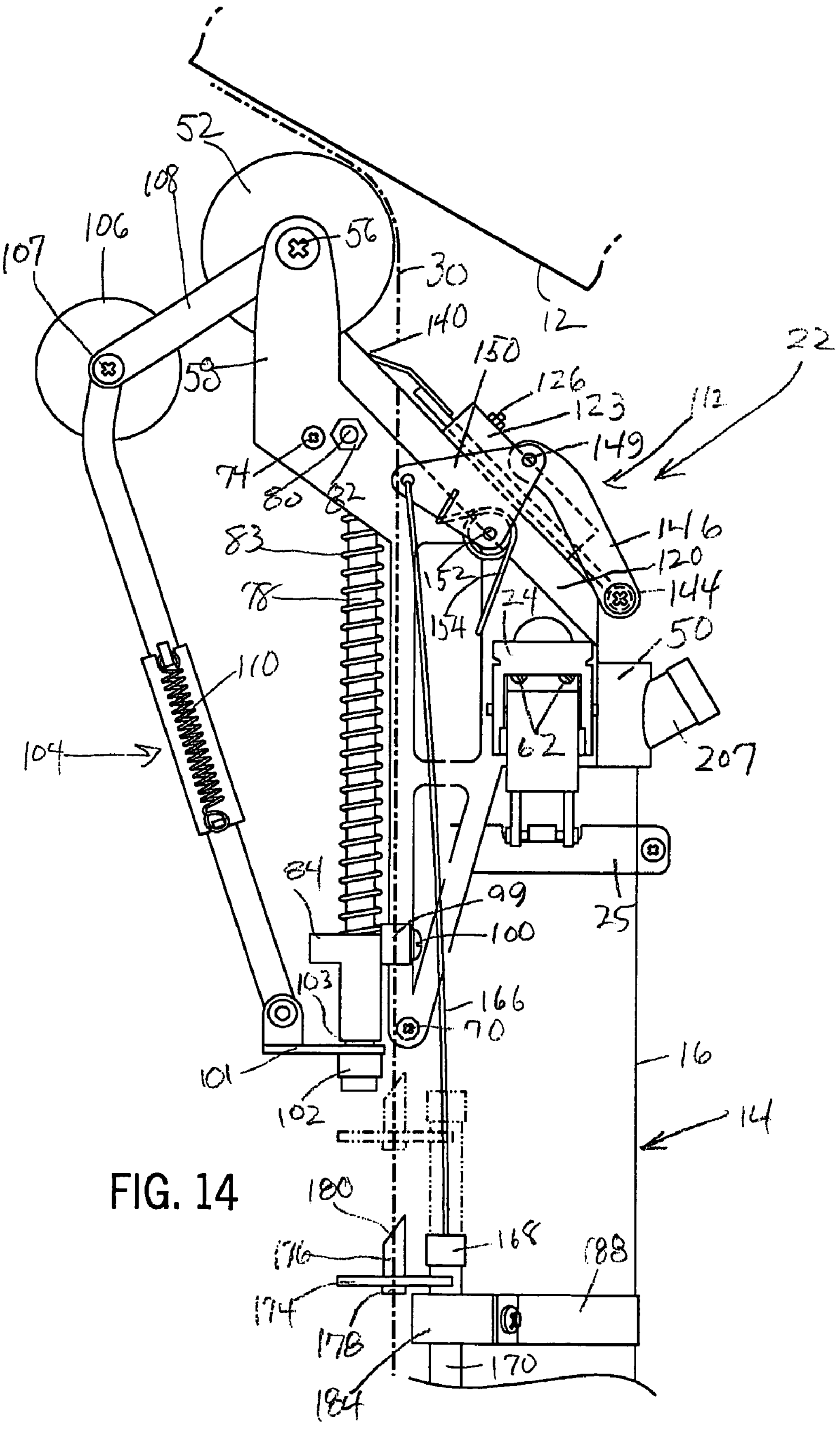
FIG. 14 is a view like FIG. 2 showing a downward force imparted on the actuating tube and actuating sleeve to cause actuation of a severing device on the face of the applicator head.

Referring again to FIG. 2 along with FIGS. 12 and 13, a third corner of the triangular link 150 is secured to an upper end of a downwardly extending connecting wire 166. The connecting wire 166 passes through a cap 168 screw threaded into an upper end of a moveable elongated actuating tube 170. The bottom end of the connecting wire 166 has a stop element 172 which is held captive within the actuating tube 170. The actuating tube 170 is designed to slide up and down upon the connecting wire 166 when desired, and normally hangs suspended from the stop element 172 as seen in FIG. 12. Immediately below the cap 168, a short plate 174 is welded transversely to the outside surface of actuating tube 170. A vertically extending cylindrical engagement rod 176 has a threaded end which passes through the plate 174 and is secured thereto by a nut 178. The top of the rod 176 is formed with a beveled surface 180 which is engageable and disengageable with the roller 102 on the bottom of tape advance block 84.

Figure 6:
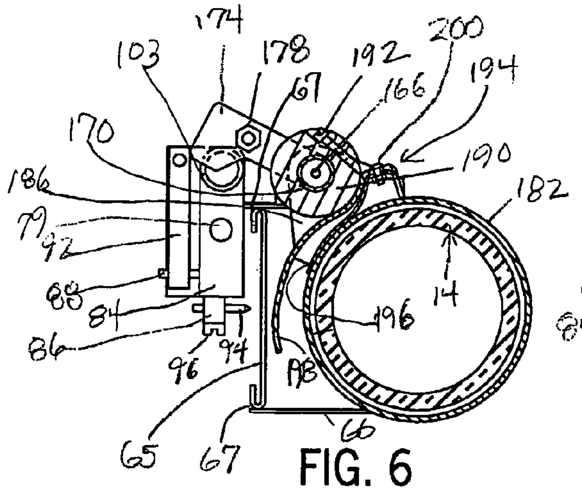
FIG. 6 is a sectional view taken on line 6-6 of FIG. 1 with an actuating sleeve, tube and trigger in an initial position.
Figure 7:
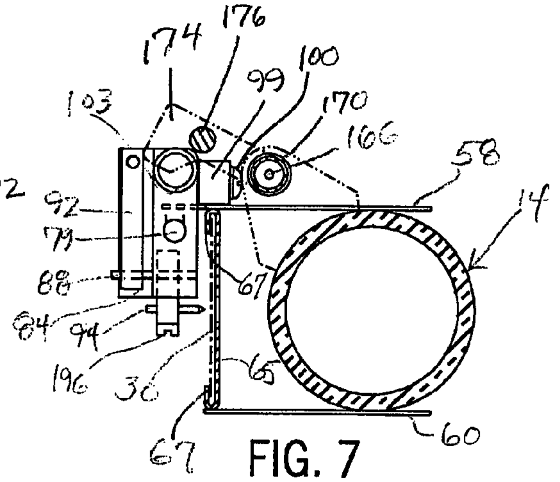
FIG. 7 is a sectional view taken on line 7-7 of FIG. 1 with the actuating sleeve and tube in the initial position.
Figure 9:
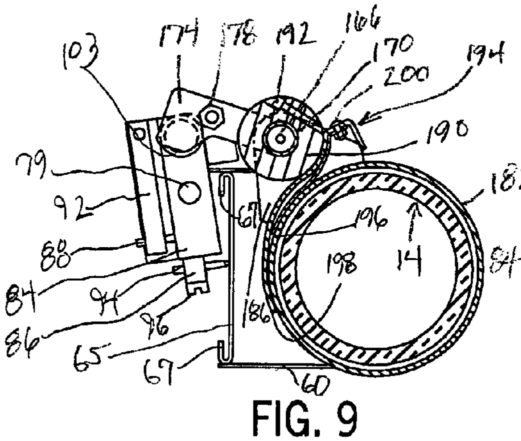
FIG. 9 is a sectional view taken on line 9-9 of FIG. 1 showing the actuating trigger engaged against the actuating sleeve to rotate the tape advancing mechanism.
Figure 10:
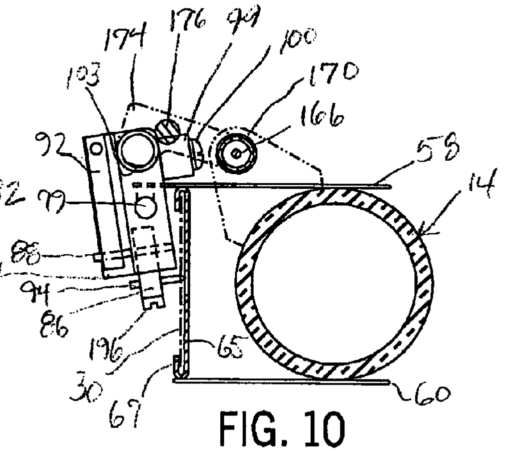
FIG. 10 is a sectional view taken on line 10-10 of FIG. 1 showing the tape advancing mechanism engaging the drywall tape.

As illustrated in FIG. 1, the actuating tube 170 extends downwardly along the outside of storage body 14 to a moveable cylindrical sleeve 182 surrounding storage body 16. As shown by arrows A and B, the sleeve 182 is slidable upwardly and downwardly along storage body 16. The actuating tube 170 is inserted through a series of plastic guide blocks 184, 185, 186, 187 which establish a sliding pathway for the tube 170. The guide blocks 184, 185 are retained against the storage body 14 by retainer straps 188, 189, respectively. With reference to FIGS. 6 and 9, the lower end of the actuating tube 170 passes through a circular split collar 190 rotatably interposed between the guide blocks 186, 187 which are fixed to the actuating sleeve 182. The collar 190 is provided with a screw 192 which is forcibly tightened to fixedly clamp the bottom end of the actuating tube 170 to the collar 190. A trigger mechanism 194 is attached to the rotatable collar 190 for the purpose of selectively rotating the actuating tube 170 and the engagement rod 176 on the upper end thereof. The trigger mechanism 194 includes a spring portion 196 attached to the collar 190 and an actuating trigger 198 which is normally biased away from the collar 190 by the spring portion 196 as shown in FIG. 6. The spring portion 196 and the actuating trigger 198 are connected by a screw 200. Together, the actuating tube 170, the actuating sleeve 182 and the actuating trigger 198 define the actuating arrangement 34.

Figure 17:
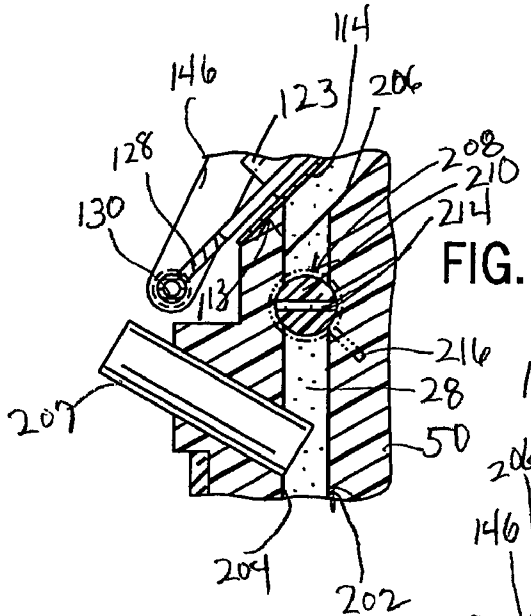
FIG. 17 is a fragmentary, partial view of FIG. 16 showing the on/off metering device in a non-flow condition.
Figure 16:
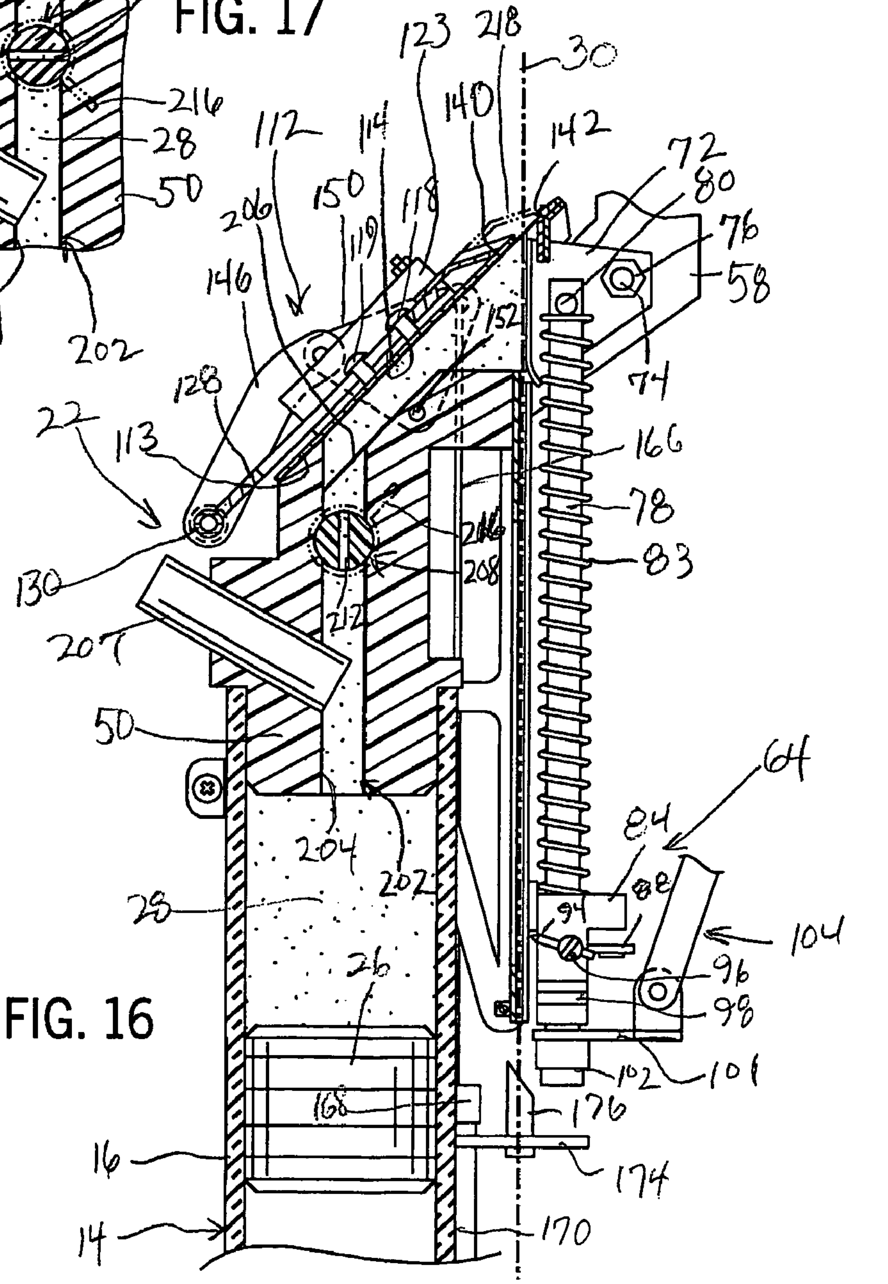
FIG. 16 is a sectional view taken on line 16-16 of FIG. 15 showing an on/off metering device in a flow condition.

As seen best in FIGS. 16 and 17, the dispenser body 50 is formed with a drywall compound passage 202 in communication with the drywall compound supply 28 in storage body 14. The passage 202 has a smaller size than the interior diameter of the storage body 14 which is normally filled with drywall compound 28. Together, the drywall compound passage 202 and the interior of the storage body 14 define a drywall compound flow path. The passage 202 has a horizontal portion 204 and an upwardly and forwardly directed portion 206 which flows along an inside surface of the face 113. A one-way fill valve 207 is mounted on the bottom of the dispenser body 50 for periodically delivering a supply of drywall compound into the passage 202 and the interior of the storage body 14. Drywall compound 28 entering the storage body 14 pushes the plunger 26 towards the power supply head 18 at a time when the compressed air supply to the power supply head 18 is cut off. It is well known that the supply of drywall compound from an external source is removed from the bottom of the fill valve 207 once the storage body 14 has been completely filled.

A metering device 208 is rotatably disposed in the drywall compound flow path within the dispenser body 50 for delivering drywall compound 28 from the storage body 14 to the tape 30 which the roller 52 presses against the wallboard joint. The metering device 208 is comprised of a generally cylindrical, on/off valve 210 which extends through and beyond dispenser body 50 and is designed to frictionally rotate in a cylindrical cavity 212 formed therein. The valve 210 is provided with a single metering hole 214 which is selectively placed into and out of communication with the drywall compound 28 by rotating the valve 210 using an adjustment pin 216 extending from one exterior end of the valve 210 adjacent side frame 60. FIG. 16 shows a flow or on condition in which drywall compound 28 freely flows from storage body 14 through body 50 to a discharge opening 218 formed between slide plate end 139 and knife edge 142. FIG. 17 illustrates a non-flow or shut-off condition in which flow or drywall compound 28 to the body 12 is obstructed. It is to be noted that the valve 208 operates independently of the main roller 52. Furthermore, it should be appreciated that the valve 208 is removable from body 50 and interchangeable with other valves 208 having differently sized metering holes 214 when it is desired to have different flow rates of drywall compound 28.

In use, drywall compound 28 supplied from an outside source is connected to the one-way fill valve 207 with the on/off valve 208 in the off or closed position shown in FIG. 17. As indicated above, drywall compound 28 entering the storage body 14 pushes the plunger 26 towards the power supply head 18. During this process, the operator may visually monitor the filling due to the transparency of the storage body 14. Drywall compound 28 will also fill a portion of the drywall compound passage 202. When the storage body 14 has been filled, the source of drywall compound 28 is disconnected from the fill valve 207. The source of compressed air is then coupled via the quick disconnect fitting 42 to the air supply control assembly 36. Pressurized air may be controllably delivered to the rear side of the plunger 26 so as to advance the drywall compound 28 towards the applicator head 22.

Figure 5:
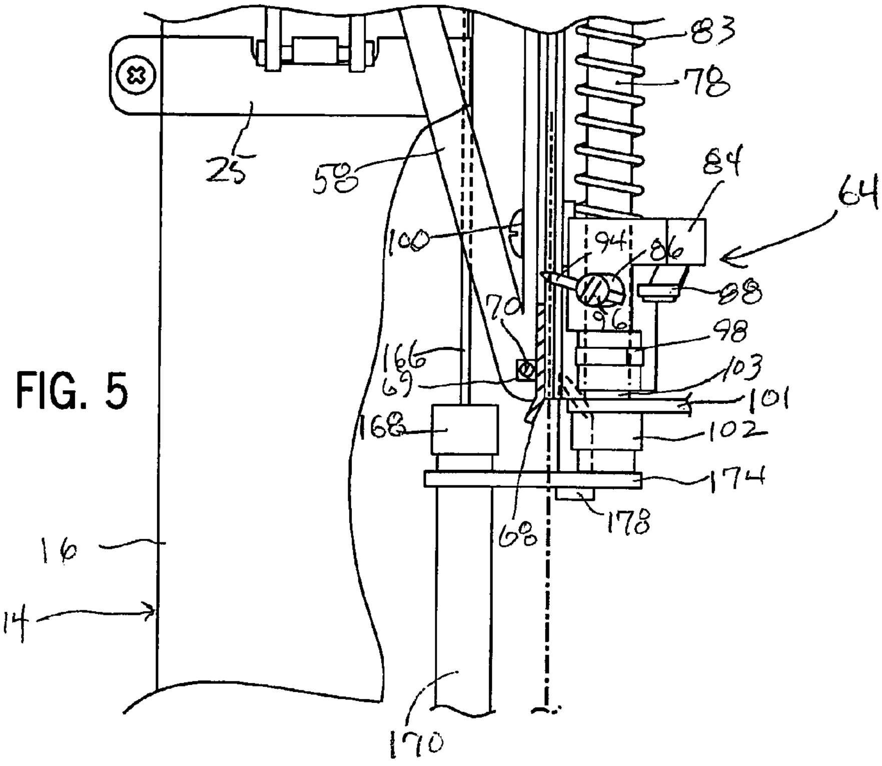
FIG. 5 is a fragmentary cutaway portion of FIG. 4 showing initial upward and rotational movement of the tape advancing mechanism into engagement with the drywall tape.
Figure 8:
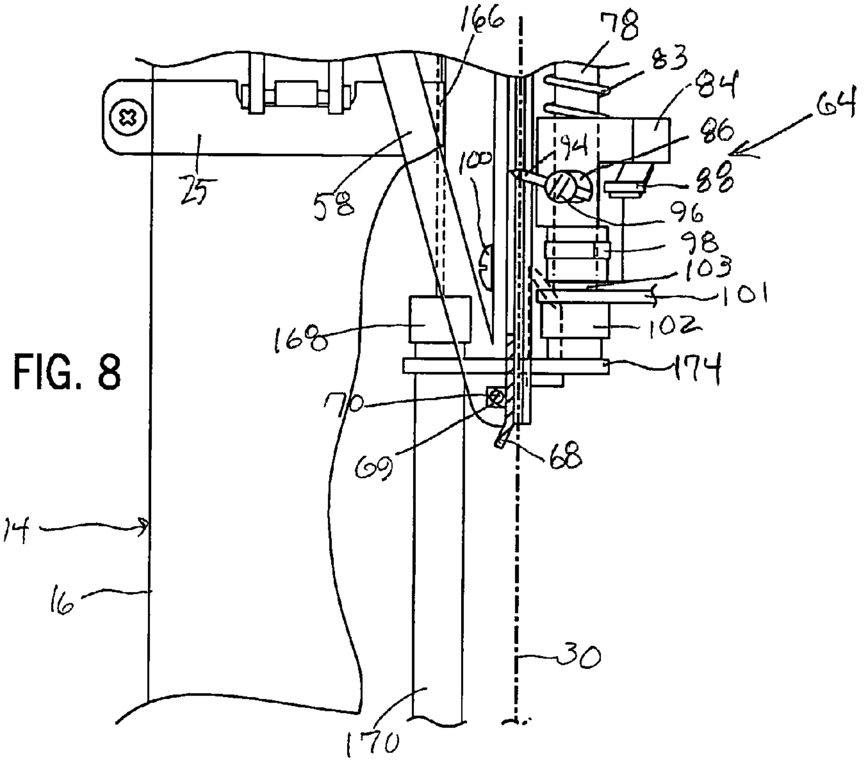
FIG. 8 is a view like FIG. 5 showing a further upward movement of the actuating tube and the tape advancing mechanism.

When the operator is ready to commence a taping operation, a leading edge of 30 from the roll mounted alongside the storage body 14 is inserted into the lower end of the guide plate 65 as shown in FIG. 3. To advance the tape 30, the operator manually slides tape 30 along guide plate 65 until the leading edge of tape 30 extends outwardly of applicator head 22 in the vicinity of roller 52. Alternatively, the operator slides the actuating sleeve 182 upwardly with one hand while holding the lower end of the apparatus 10 near the air supply handle 48 with the other hand. As sleeve 182 is moved upwardly in the direction of arrow A in FIG. 1, trigger 198 is simultaneously squeezed causing the actuating tube 170 to rotate so that the engagement rod 176 will contact roller 102 (FIGS. 12-13). This results in pivoting block 84 about rail 78 to bring the tape engaging pin 194 into engagement with the leading edge of the tape 30 (FIG. 5). Further upward movement of sleeve 182 (FIG. 8) will enable the tape 30 to advance until the leading edge of the tape 30 extends outwardly of the applicator head 22 in the vicinity of roller 52. Trigger 198 is then released and spring 83 which is compressed by the movement of sleeve 182 will aid in returning sleeve 182 to its initial position. At this point, the actuating sleeve 182 is moved downwardly in the direction of arrow B (FIG. 1) so as to pull the connecting wire 166 downwardly and actuate the severing device 112 in order to cut off the excess tape extending past the discharge opening 218 (FIG. 16) on applicator head 22. Specifically, pulling down on wire 166 against the force of torsion springs 154, 162 will pivot the triangular link 150 and the straight link 158 from the position of FIG. 2 to the position of FIG. 14. Pivoting links 150, 158 will cause link arms 146, 148 and slide plate 128 to slide forwardly, as shown in phantom lines in FIG. 15, so that knife edge 140 will move towards knife edge 142 severing the excess portion of tape 30 therebetween. Screws 118 and 119 limit the rearward and forward travel of slide plate 128. The restoring force of the torsion springs 154, 162 will return the severing device 112 and the sleeve 182 to their initial position in FIGS. 1 and 2 when sleeve 182 is released.

With removal of excess tape 30, the on/off valve 208 is then rotated to the on position (FIG. 16) so that compound 28 can freely flow from storage body 14 towards the discharge opening 218. The operator then simultaneously activates an air supply handle 48 and again moves the sleeve 182 upwardly along wire 166 and engages trigger 198. This results in drywall compound 28 being applied to the underside of tape 30 at the same time as tape 30 is advanced from for a short distance past the roller 52. Now, the drywall compound-coated tape 30 can be engaged by roller 52 for application along the desired drywall joint as seen in FIG. 2. Tape 30 from its roll is further advanced by continued engagement between the roller 52 and drywall compound-coated tape 30 against the wallboard 12 so that the trigger 198 can be released and actuating sleeve 182 can be returned to its initial position shown in FIG. 1. At the end of the individual taping procedure, such as when the operator reaches the end of a drywall joint, the actuating sleeve 182 is moved downwardly as described above to actuate the severing device 112 so as to chop the drywall compound-coated tape 30 adjacent to discharge opening 218. A new taping procedure continues as set forth above.

In some instances, it may be desirable to apply a crease or fold in the drywall compound-coated tape 30 as it is applied against the wallboard 12. In such case, the actuating sleeve 182 alone is raised along wire 166 to an uppermost position shown in FIG. 11 against the bias of spring 83 causing the strut arrangement 104 to shift upwardly with a self-compensating behavior from the retracted position shown in FIG. 2 to an extended position. This upward motion of sleeve 182 thus results in shifting the creaser wheel 106 forwardly and upwardly of roller 52 and into engagement against the drywall compound-coated tape 30 and wallboard 12, such as in corner joints. Releasing the actuating sleeve 182 will enable return of the strut arrangement 104 to its retracted position due to the release of compressed spring 83. When the taping operation is finished for the day, the pressurized air supply is disconnected and the apparatus 10 may be cleaned such as by removing the applicator head 22 and the power supply head 18 and rinsing these parts and the storage body 14 in water. Although not part of the invention, the applicator head 22 may be replaced by other air-actuated finishing tool, if desired.

It should be appreciated that the present invention provides a pressurized drywall taper with total control for simultaneously supplying drywall tape and drywall compound to a wallboard joint, selectively severing the drywall tape and controllably actuating a creaser wheel. Unlike cable-actuated drywall tapers, the present invention employs a pressurized supply of drywall compound which enables a more uniform delivery of mud to the drywall joint being taped. The current drywall taper removes the need to physically push a drive wheel interconnected to a tape advance mechanism. By eliminating drag, a mud-taping procedure is much easier for an operator to perform. If necessary, the tension on the drywall tape may be adjusted as it is being applied. The drywall taper may apply varying amounts of drywall compound depending on the moving speed of the apparatus and/or the air pressure regulation. Drywall compound may continue to be delivered, if desired, even if the tape is stopped. In the present design, the severing device is more accessibly located on the front face of the applicator head and is designed with a transfer linkage, slide plate and knife system which is less prone to jam and which effectively eliminates partial severing of the tape to give a more positive cutting action. The transparent storage body is conveniently detachable from the applicator head and the air supply head to accommodate various lengths and allow easy cleaning. Depending on the application, the on/off metering valve is removable from the body and may be replaced with different valves having different metering rates.

Figure 18:
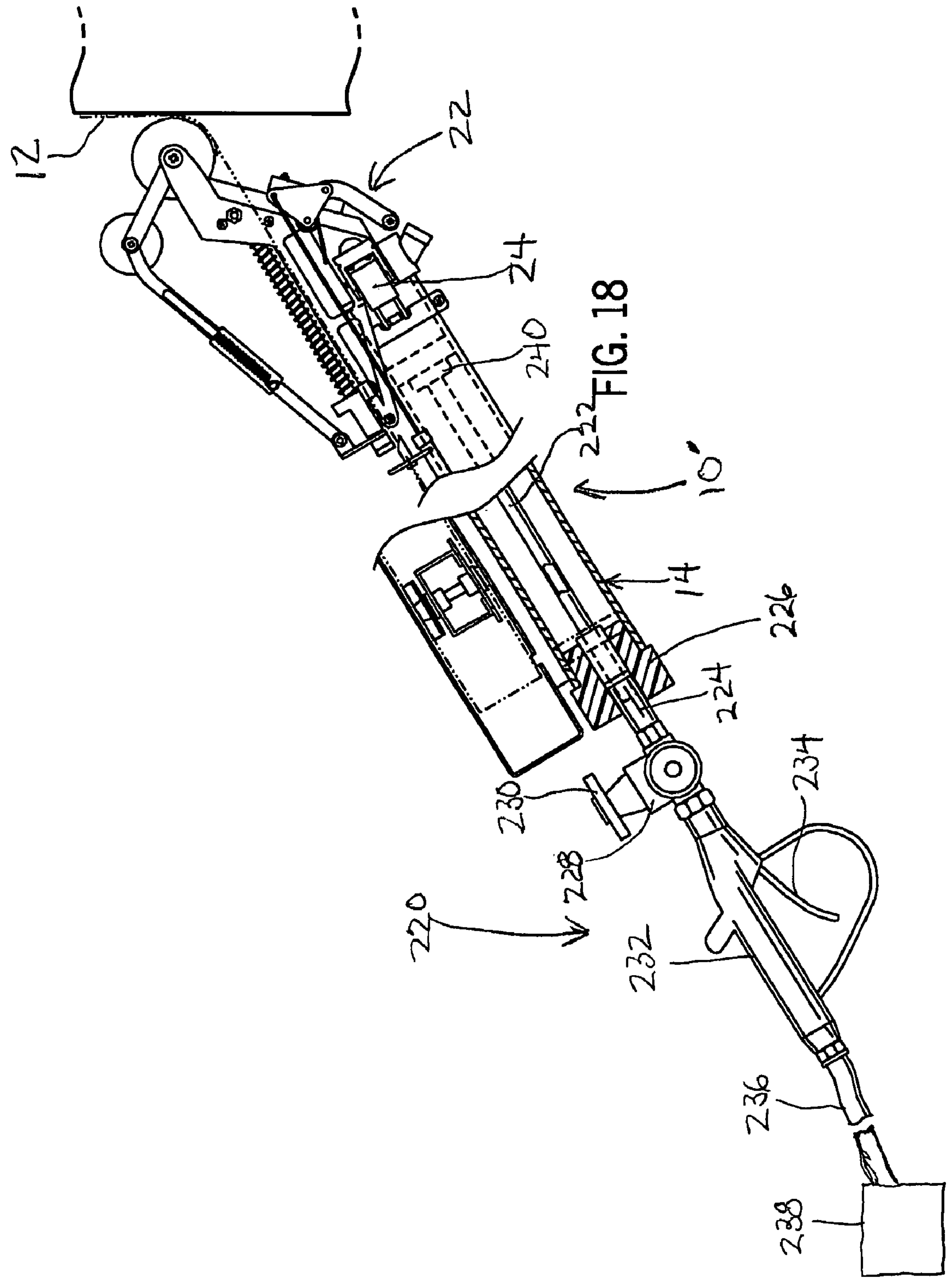
FIG. 18 is an elevational view of an alternative embodiment of an apparatus for applying tape and drywall compound to wallboard joints.

Referring now to FIGS. 18-20, the present invention also contemplates an alternative embodiment of the apparatus 10 which permits substantially continuous flow of drywall compound 28 to wallboard joints using substantially the design of applicator head 22. The alternative apparatus 10' includes storage body 14 having a bottom end provided with a power supply head 220 detachably coupled thereto by latches 20 as seen in FIG. 1. Storage body 14 also includes a top end provided with applicator head 22 detachably connected thereto by latches 24. In this design, the plunger 26 is eliminated so that a stainless steel, unobstructed delivery tube 222 having an inner diameter of about 7/16 inches for carrying drywall compound 28 from power supply head 220 to applicator head 22 extends through the center of the storage body 14 between heads 22, 220.

A bottom end of the delivery tube 222 is attached to a tubular live swivel 224 anchored in an adapter end 226 of power supply head 18. A high pressure needle valve 228 having an adjustment control 230 has one end rotatably coupled to the live swivel 224. An opposite end of the needle valve 228 is threadably attached to an outlet of an in-line valve 232 provided with a handle 234. An inlet end of in-line valve 232 is connected by a supply line 236 to a source 238 of pressurized drywall compound 28. The live swivel 224 permits the needle valve 228 and the in-line valve 232 to swivel 360 degrees relative to the delivery tube 222 and the storage body 14. A top end of the delivery tube 222 has a tubular feed adapter 240 which is tightly sealed in the rear of the applicator head 22 to permit communication between the delivery tube 222 and the applicator head 22. Instead of shut-off/metering device 208, applicator head 22 is provided with a replacement metering plug 242 shown in FIGS. 19 and 20. The metering plug 242 has a reduced diameter grooved portion 244 which is aligned with the drywall compound passage 202 so that the drywall compound 28 will be continuously metered therethrough. The delivery tube 222 together with the passage 202 define a drywall compound flow path extending from the bottom end of the storage body 14 to the discharge opening 218 on applicator head 22.

It should be understood that unlike the embodiment of FIGS. 1-17, the apparatus 10' does not rely upon one way fill valve 207 on applicator head 22 to repeatedly fill the entire interior of the storage body 14. Instead, pressurized drywall compound 28 supplied from source 238 through supply line 236 is fed to in-line valve 232. The handle 234 on in-line valve 232 acts as an on/off and volume control to selectively allow a variable volume of drywall compound flow at a certain pressure as dictated by needle valve control 230 to move through the apparatus 10'. Typically, drywall compound 28 entering the in-line valve 232 at 2,000-3,000 pound per square inch will be stepped down by the internal restriction in the needle valve 228 to a pressure of at least 40-50 pounds per square inch. The pressurized drywall compound 28 then flows substantially continuously through live swivel 224, the delivery tube 222 and the feed adapter 240 to applicator head 222. Drywall compound flow entering the applicator head 22 is metered uninterruptedly through the passage 202 in the groove 244 and plug 242 to discharge opening 218 until the handle 234 on in-line valve 232 is disengaged to stop the supply of drywall compound 28 from source 238.

The substantially continuous flow of drywall compound 28 provided by apparatus 10' further increases the operating efficiency in drywall panel erection. In enhancing the operability of the apparatus 10, the filled weight of apparatus 10' is approximately ⅓ the weight of apparatus 10. Handling of the apparatus 10' is improved by the swivel mounting of the needle valve 228 and the in-line valve 232.

While the invention has been described with reference to a preferred embodiment, those skilled in the art will appreciate that certain substitutions, alterations and omissions may be made without departing from the spirit thereof. Accordingly, the foregoing description is meant to be exemplary only and should not be deemed limitative on the scope of the invention set forth with the following claims.

We claim:

1. A drywall taper for applying drywall compound and tape to a wallboard joint, the drywall taper comprising:

a hollow storage body for holding a supply of drywall compound;

a moveable plunger disposed within the storage body and engageable with the drywall compound;

an applicator head connected to a top end of the hollow storage body, the applicator head having a drywall compound passage formed therein, a roller rotatably mounted thereon for engaging the tape against the wallboard joint, a tape advancing mechanism attached thereon for advancing a supply of tape to the roller, a tape severing device secured thereto for selectively cutting the tape and a creaser wheel assembly moveably mounted thereon for selectively engaging the tape against the wallboard in advance of the roller;

a driving source independent of the roller and engageable with the plunger for selectively providing a driving force such that the plunger pushes the supply of drywall compound out of the storage body through the drywall compound passage in the applicator head; and an actuating assembly slidably mounted on the storage body and engaged with the tape advancing mechanism, the tape severing device and the creaser wheel assembly for separately and individually controlling tape advancement, tape severing and movement of the creaser wheel assembly.

2. The drywall taper of claim 1, wherein the applicator head includes a dispenser body having a top to which the tape advancing mechanism is secured, a bottom provided with a fill valve for filling the body with drywall compound and an inclined front face to which the tape severing device is joined.

3. The drywall taper of claim 2, wherein the dispenser body includes an interchangeable, rotatable on/off metering valve disposed in the drywall compound passage.

4. The drywall taper of claim 1, wherein the tape severing device is fully accessible externally of the applicator head.

5. The drywall taper of claim 1, wherein the storage body is transparent.

6. The drywall taper of claim 1, wherein the storage body is interchangeable.

7. The drywall taper of claim 1, wherein a power supply head is connected to a bottom end of the storage body.

8. The drywall taper of claim 7, wherein the driving source is in communication with the power supply head.

9. The drywall taper of claim 7, further including an air supply control assembly attached to the power supply head.

10. The drywall taper of claim 1, wherein the driving source is compressed air pushing against the plunger.

11. In a drywall taper for applying drywall compound and tape to a wallboard joint and having an applicator head mounted on one end of a drywall compound storage device, there being a drywall compound flow path extending from an opposite end of the storage device to an outlet on the applicator head, an arrangement for delivering drywall compound through the drywall compound flow path, a roller rotatably mounted on the applicator head for contacting a wallboard, a tape advancing mechanism secured on the applicator head for advancing a supply of tape to the outlet and to the roller, a tape severing device connected to the applicator head for cutting the tape, and a creaser wheel assembly moveably mounted to the applicator head, the improvement comprising:

an actuating arrangement slidably disposed upon the storage body and engaged with the tape advancing mechanism, the tape severing device and the creaser wheel assembly for separately controlling tape advancement, tape severing and creaser wheel movement, the actuating arrangement being slidable in one direction to separately control tape advancement and creaser wheel movement, and slidable in an opposite direction to control tape severing, the slidable actuating arrangement including an actuating trigger mechanism connected to a rotatable actuating tube and movable between a first position allowing tape advancement and a second position allowing creaser wheel movement.

12. The improvement of claim 11, wherein the arrangement for delivering drywall compound is independent of the roller.

13. In a drywall taper for applying drywall compound and tape to a wallboard joint and having an applicator head mounted on one end of a drywall compound storage device, the applicator head having a dispenser body, there being a drywall compound flow path extending from an opposite end of the storage device to an outlet on the dispenser body, an arrangement for delivering drywall compound through the drywall compound flow path, a roller rotatably mounted on the applicator head for contacting a wallboard, a tape advancing mechanism secured on the applicator head for advancing a supply of tape to the outlet end to the roller, a tape severing device connected to the applicator head for cutting the tape, and an actuating arrangement movably mounted on the storage device for actuating the tape advancing mechanism and the tape severing device, the improvement wherein:

the tape advancing mechanism is secured on the top of the dispenser body; and the tape severing device is mounted on an inclined front face of the dispenser body away from the tape advancing mechanism so that the tape severing mechanism is fully accessible from an exterior of the applicator head, wherein the tape severing device includes:

a mounting plate fixed to the front face of the dispenser body;

a pair of spaced apart side blocks secured to the mounting plate;

a slide plate slidably received in the slide blocks; and a pair of moveable link arms extending alongside the slide blocks, the link arms being connected at rear ends by a transverse bar attached to the slide plate, and being joined at front ends to a pair of interconnected links pivotally connected to the applicator head, one of the links being attached by a connecting wire to the actuating arrangement.

14. The improvement of claim 13, wherein the links are interconnected by a rod extending across the dispenser body.

15. The improvement of claim 13, including a moveable angled knife edge fixed to the slide plate and a stationary knife edge fixed to the front end of the mounting plate.

16. The improvement of claim 15, wherein the moveable knife edge is normally spaced from the fixed knife edge to define a tape-receiving gap aligned with the outlet in the dispenser body.

17. A drywall taper for applying drywall compound and tape to a wallboard joint, the drywall taper comprising:

a hollow storage body;

an applicator head connected to a top end of the hollow storage body, the applicator head having a drywall compound passage formed therein, a roller rotatably mounted thereon for engaging the tape against the wallboard joint, a tape advancing mechanism attached thereon for advancing a supply of tape to the roller, a taper severing device secured thereto for selectively cutting the tape and a creaser wheel assembly having a creaser wheel moveably mounted on the applicator head for selectively engaging the tape against the wallboard in advance of the roller;

a delivery tube disposed in the storage body for delivering drywall compound completely therethrough, the delivery tube having a first end connected to a drywall compound supply assembly fed directly by a source of pressurized drywall compound, and a second end opposite the first end connected to and in communication with the applicator head; and an actuating arrangement slidably mounted on the storage body and engaged with the tape advancing mechanism, the tape severing device and the creaser wheel assembly for separately and individually controlling the tape advancement, tape severing and movement of the creaser wheel assembly, the actuating arrangement being slidable in one direction to separately control tape advancement and creaser wheel movement, and slidable in an opposite direction to control tape severing, the slidable actuating arrangement including an actuating trigger mechanism connected to a rotatable actuating tube and movable between a first position allowing tape advancement and a second position allowing creaser wheel movement, the creaser wheel assembly including an articulated strut arrangement for holding the creaser wheel, the strut arrangement having an upper end pivotally connected to the roller and a lower end selectively engageable with the actuating tube.

18. The drywall taper of the claim 17, wherein a bottom end of the storage body is connected to the drywall compound supply assembly.

19. The drywall taper of claim 17, wherein the drywall compound supply assembly includes a live swivel rotatably coupled to a needle valve and an in-line valve.

20. The drywall taper of claim 19, wherein the needle valve has an adjustment control for altering volume of drywall compound supplied through the in-line valve.

21. The drywall taper of claim 19, wherein the in-line valve includes a handle for controlling admission of pressurized drywall compound therethrough.

22. The drywall taper of claim 17, wherein the applicator head includes a plug having a grooved portion for continuously metering drywall compound.

23. In a drywall taper for applying drywall compound and tape to a wallboard joint and having an applicator head mounted on one end of a drywall compound storage device, there being a drywall compound flow path extending from an opposite end of the storage device to an outlet on the applicator head, an arrangement for delivering drywall compound through the drywall compound flow path, a roller rotatably mounted on the applicator head for contacting a wallboard, a tape advancing mechanism secured on the applicator head for advancing a supply of tape to the outlet and to the roller, a tape severing device connected to the applicator head for cutting the tape, and a creaser wheel assembly moveably mounted to the applicator head, the improvement comprising:

an actuating arrangement slidably disposed upon the storage body and engaged with the tape advancing mechanism, the tape severing device and the creaser wheel assembly for separately controlling tape advancement, tape severing and creaser wheel movement, wherein the actuating arrangement includes an actuating sleeve surrounding the storage body, and an actuating tube having a lower end connected to the sleeve for sliding movement therewith and for rotatable movement relative to the sleeve by means of a spring-biased trigger mechanism engaged with the sleeve, and wherein the actuating tube is slidable along a connecting wire having an upper end attached to the tape severing device and the lower end having a stop element located within an interior of the actuating tube and engageable with a cap on an upper end of the actuating tube.

* * * * *

UNITED STATES PATENT AND TRADEMARK OFFICE

CERTIFICATE OF CORRECTION

PATENT NO. : 7,621,309 B1
APPLICATION NO. : 11/172485
DATED : November 24, 2009
INVENTOR(S) : Mondloch et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1182 days.

Signed and Sealed this

Twenty-sixth Day of October, 2010

David J. Kappos

*Director of the United States Patent and Trademark Office*